United States Patent [19]

Hirota

[11] Patent Number: 4,692,391

[45] Date of Patent: Sep. 8, 1987

[54] CELL STACK ASSEMBLY STRUCTURE FOR FUEL CELL

[75] Inventor: Toshio Hirota, Kanagawa, Japan

[73] Assignee: Fuji Electric Company, Ltd., Kanagawa, Japan

[21] Appl. No.: 873,485

[22] Filed: Jun. 12, 1986

Related U.S. Application Data

[63] Continuation of Ser. No. 689,977, Jan. 9, 1985.

[30] Foreign Application Priority Data

Jan. 10, 1984 [JP] Japan .............................. 59-1519[U]

[51] Int. Cl.$^4$ .................. H01M 2/00; H01M 2/08
[52] U.S. Cl. .................................. 429/34; 429/37; 429/39
[58] Field of Search .............................. 429/26, 34–39

[56] References Cited

U.S. PATENT DOCUMENTS

| | | | |
|---|---|---|---|
| 409,365 | 8/1889 | Mond et al. ............................ | 429/38 |
| 3,462,307 | 8/1969 | Voorhies et al. ................. | 429/37 X |
| 3,573,104 | 3/1971 | Snyder et al. ......................... | 424/37 |
| 4,390,602 | 6/1983 | Struthers ............................... | 429/26 |
| 4,397,918 | 8/1983 | Chi ......................................... | 429/26 |
| 4,430,390 | 2/1984 | Fekete .................................. | 429/34 |
| 4,431,714 | 2/1984 | Myerhorf ............................. | 429/26 |

OTHER PUBLICATIONS

Cohn, "NASA's Fuel Cell Program", *Fuel Cell Systems*, 1965, Washington, D.C., American Chemical Society, pp. 1–8.

*Primary Examiner*—Brian E. Hearn
*Assistant Examiner*—Stephen J. Kalafut
*Attorney, Agent, or Firm*—Finnegan, Henderson, Farabow, Garrett and Dunner

[57] ABSTRACT

Herein disclosed is a cell stack assembly structure for a fuel cell, comprising a plurality of units each of which is composed of a plurality of cell elements laminated in advance and which are stacked and fastened under a predetermined pressure to construct a cell stack assembly. Each of a plurality of end plates is interposed between any adjacent two of the units. Removable pressure means are provided for fastening under a predetermined pressure any two of the end plates, that are positioned at the two ends of a corresponding one of the units.

9 Claims, 12 Drawing Figures

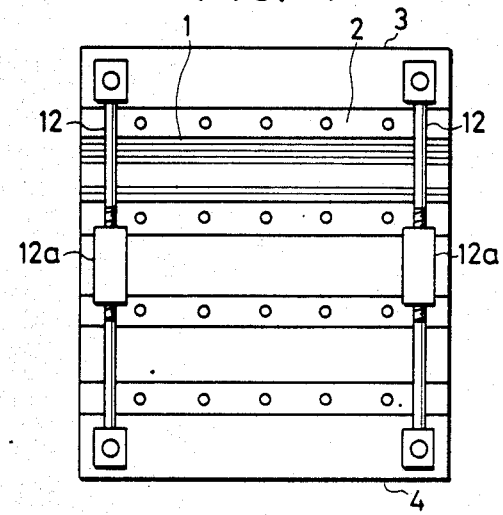
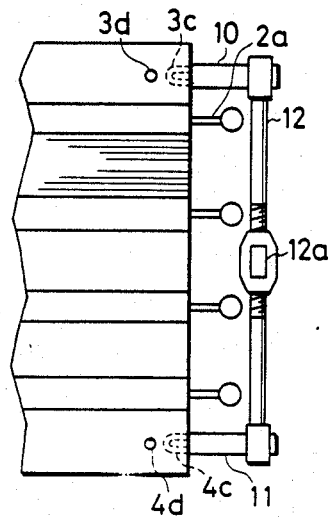
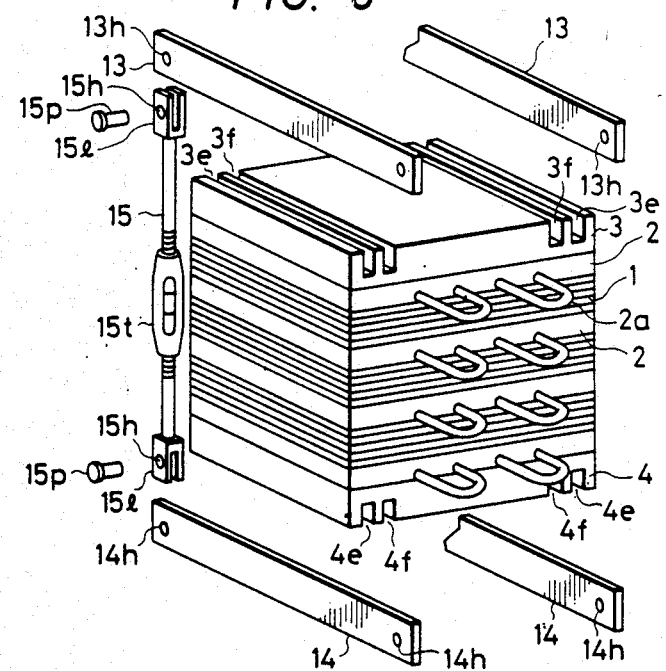

CELL STACK ASSEMBLY STRUCTURE FOR FUEL CELL

This application is a continuation of application Ser. No. 689,977, filed Jan. 9, 1985.

BACKGROUND OF THE INVENTION

1. Field of the Invention

The present invention relates to a fuel cell and, more particularly, to an assembly structure for the fuel cell, in which a cell stack having a plurality of square units of laminated cell elements stacked in a column shape is fastened from both its end faces by fastening means.

2. Description of the Prior Art

Generally speaking, a fuel cell is constructed into a cell stack: by stacking in a column shape both a number of cell elements, each of which is composed of a matrix layer impregnated with an electrolyte, a porous fuel electrode and a porous oxidizer electrode sandwiching the matrix layer inbetween, a plate disposed outside and formed with grooves for supplying fuel gases as reactive gases, and a plate disposed outside and formed with grooves extending at a right angle with respect to the former supply grooves for supplying oxidizing gases, and a number of cooling plates sandwiched between every plural ones of the cell elements for cooling the heat generated when the fuel cell is run; and by fastening the cell elements and the cooling plates in the stacking direction.

In this case, according to the prior art, there has been adopted a structure in which several to several tens of the cell elements are joined in advance to form a unit laminate and in which a plurality of the laminates are stacked to form the cell stack. Only the units having satisfactory characteristics can be assembled into the cell stack by laminating the cell elements in advance into the unit and by testing the characteristics of the units thus laminated before these units are stacked. Thus, it is possible to prevent any bad cell element or elements from being assembled into the cell stack.

Despite of this fact, however, the characteristic tests of the units are conducted under the state in which the units are fastened under a predetermined pressure. As a result, if the units having been tested are released from the fastening pressure when they are to be assembled into the cell stack, there arises a problem that the matrix layers or sealing members are broken so that the electric and thermal resistances are increased. Therefore, it has been desired that the units can be assembled after the tests into the cell stack while being fastened.

SUMMARY OF THE INVENTION

In view of the aforementioned defects of the prior art, therefore, an object of the present invention is to provide a cell stack assembly structure for a fuel cell, which is enabled to stack under a fastening pressure a plurality of units laminates each composed of a small number of laminate elements, even after each of the unit laminates has been tested, by fastening the unit laminates by the use of removable fastening means.

According to a major feature of the present invention, there is provided a cell stack assembly structure for a fuel cell, comprising a plurality of units each of which is composed of a plurality of cell elements laminated in advance and which are stacked and fastened under a predetermined pressure to construct a cell stack assembly, wherein the improvement comprises: a plurality of end plates each interposed between any adjacent two of said units; and removable pressure means for fastening under a predetermined pressure any two of said end plates, that are positioned at the two ends of a corresponding one of said units.

BRIEF DESCRIPTION OF THE DRAWINGS

FIG. 4 is a front elevation showing a unit laminate to which is attached fastening means according to another embodiment of the present invention;

FIG. 5 is a side elevation showing a portion of FIG. 4;

FIG. 6 is an exploded perspective view showing a unit laminate to which is attached fastening means according to still another embodiment of the present invention;

DESCRIPTION OF THE PREFERRED EMBODIMENTS

Figure 1:
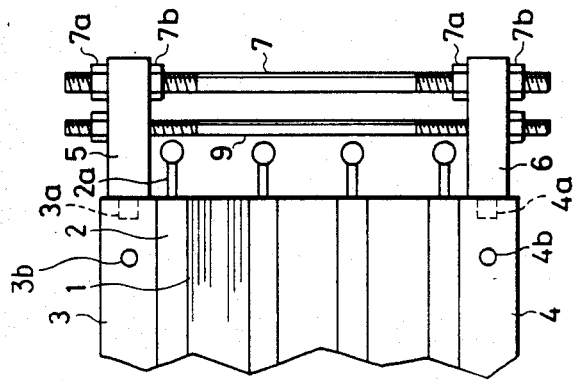
FIG. 1 is a front elevation showing a unit laminate to which is attached fastening means according to one embodiment of the present invention.
Figure 2:
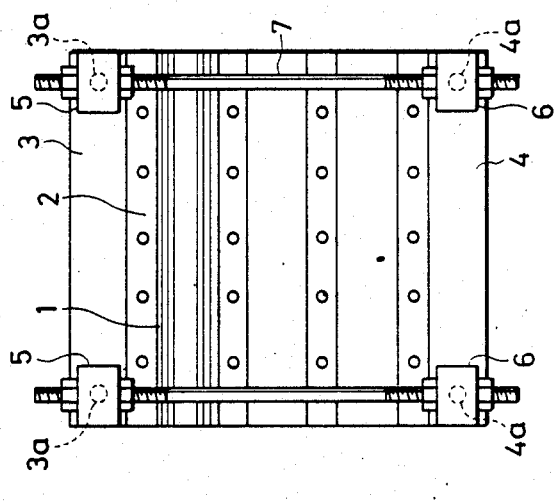
FIG. 2 is a side elevation showing a portion of FIG. 1.

The present invention will be described in the following in connection with the embodiments thereof with reference to the accompanying drawings. FIG. 1 is a front elevation showing one embodiment of the present invention, and FIG. 2 is a side elevation of FIG. 1. In the Figures subsequent to FIGS. 1 and 2, incidentally, the pressure means of the present invention is constructed of fastening means and engagement members, and identical parts and portions are indicated at identical reference characters.

In FIGS. 1 and 2, reference numeral 1 indicates an assembly which is composed of some stacked cell elements, and a cooling plate 2 arranged with a cooling pipe 2a is attached to each assembly 1. Several tens of laminate units each composed of the assembly of the cell elements and the cooling plate 2 are stacked, and an upper end plate 3 and a lower end plate 4 are placed on the upper and lower ends of the stack, respectively, to construct one unit laminate. Those upper and lower end plates 3 and 4 are formed with holes 3a and 4a in the four corners of the opposed sides thereof and with holes 3b and 4b in the four corners of the sides intersecting the former sides at a right angle. In order to fasten the unit laminate, holding plates 5 and 6 acting as engagement members are fitted in the holes, e.g., the holes 3a and 4a, respectively, which are formed in the opposed sides of the end plates, and support studs 7 extending through those holding plates 5 and 6 are fastened through the holding plates 5 and 6 by means of nuts 7a and 7b thereby to fix the holding plates 5 and 6. By fastening screws 9 acting as fastening means, moreover, the unit laminate is fastened at its four corners through the holding plates 5 and 6. Between those fastening screws 9, there is interposed a not-shown reactive gas manifold so that the unit laminate is tested by supplying reactive gases to that manifold. The unit laminates to be overlaid and underlaid on the foregoing unit laminate are fastened in the same manner as above by making use of the holes 3b and 4b which are formed in the four corners of the opposed sides at a right angle with respect to the holes 3a and 4a shown in FIG. 2.

Figure 3:
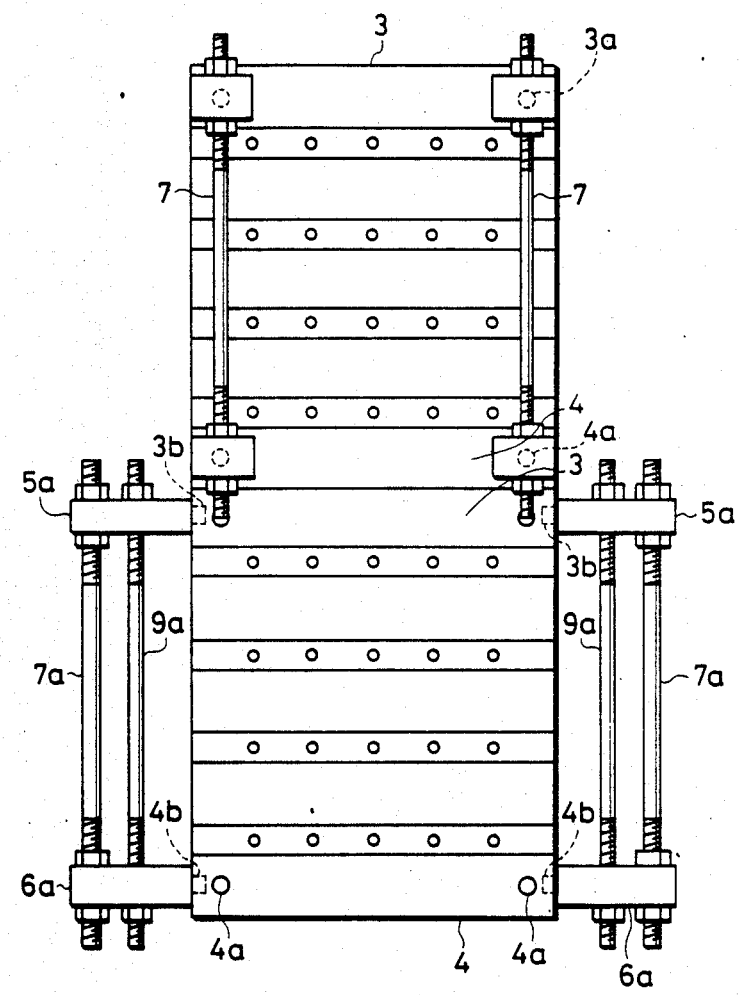
FIG. 3 is a front elevation showing a unit laminate to which is attached the fastening means according to the embodiment of the present invention.

FIG. 3 is a front elevation showing the structure in which there are stacked two of the unit laminates fastened at the sides intersecting with each other at a right angle, as above. In FIG. 3, the lower unit laminate is fixed by the support studs 7a through the holding plates 5a and 6a fitted in the holes 3b and 4b and is fastened by means of the fastening screws 9a so that it is solely tested, as above.

As a result, if the numerous unit laminates are placed one on another to construct the stack while being fastened by the aforementioned structure, their engagement members and fastening means are arranged in a zigzag shape for each unit laminate. Thus, even if the fastening screws, the support studs and so on become higher than the unit laminates, they are prevented from interfering with those of the adjoining unit laminates so that the cell stack can be constructed with the unit laminates being fastened. After a desired number of the unit laminates have been stacked, the cell stack can be assembled if all the units are fastened by the well known fastening means, although not shown, and if the holding plates and the fastening screws are removed from the respective unit laminates.

FIG. 4 is a front elevation showing another embodiment of the present invention, and FIG. 5 is a side elevation showing a portion of FIG. 4. In FIGS. 4 and 5, the unit laminate, which is constructed of several tens of the laminate units each composed of the assembly 1 of several cell elements and the cooling plate 2, the upper end plate 3 overlaid on the laminate and the lower end plate 4 underlaid on the laminate, is formed with threaded holes 3c and 4c at the four corners of the opposed sides of the upper and lower end plates 3 and 4 and with threaded holes 3d and 4d at the four corners of the sides intersecting the former sides at a right angle. The test is completed by screwing and fixing fixing studs 10 and 11 acting as the engagement members in the aforementioned threaded holes 3d and 4d, respectively, and by attaching fastening screws 12 acting as the fastening means and having turn buckles 12a to fasten the unit laminate.

The upper and lower unit laminates adjoining the foregoing unit laminate are tested by attaching the fixing studs in a manner similar to the aforementioned one in the threaded holes 3d and 4d, which are formed in the sides perpendicular to the threaded holes 3c and 4c, and by fastening the unit laminates with the fastening screws having the turn buckles. Moreover, a desired number of the unit laminates are stacked to construct the cell stack while being fastened. Then, the fastening means of the unit laminates are arranged in a zigzag shape for each unit laminate. As a result, the fastening screws are prevented from interferring with each other, even if they become higher than the unit laminates, so that the cell stack can be constructed with the unit laminates being left fastened. Incidentally, in case the fatening screws are made compact by the use of the turn buckles so that they are lower than the unit laminates, as shown in FIG. 4, it is apparent that the arrangement of the fastening means need not be zigzag. The works after stacking the desired number of the unit laminates are identical to the aforementioned ones.

FIG. 6 is an exploded perspective view showing still another embodiment of the present invention. In FIG. 6, the cooling plate 2 having the cooling pipe 2a is attached to each assembly 1 composed of some cell elements. Several tens of the laminate units each composed of the assembly 1 of the cell elements and the cooling plate 2 are stacked to construct one unit laminate by attaching the upper end plate 3 and the lower end plate 4 to the upper and lower sides of the same, respectively. The upper end plate 3 is formed in its end face with two grooves 3e and 3f which extend along the edges of both the sides thereof, and the lower end plate 4 is formed at both its sides with two grooves 4e and 4f which are opposed to the grooves 3e and 3f of the upper end plate. In FIG. 6, two fastening bars 13 acting as the engagement members are fitted in the grooves 3e of the upper end plate, respectively, whereas other two fastening bars 14 are fitted in the grooves 4e of the lower end plate, respectively. The fastening bars 13 and 14 are connected to fastening screws 15, which have turn buckles 15t acting as the fastening means, by fitting joints 15l, which have split grooves formed in the upper and lower end portions of the fastening screws 15 between the fastening bars 13 and 14, and by fitting pins 15p into holes 15h of the joints 15l and pin holes 13h and 14h of the fastening bars 13 and 14. By turning the turn buckles 15t of the fastening screws 15, the unit laminate is fastened through the fastening bars 13 and 14. Between the fastening screws 15, there is interposed a not-shown reaction gas manifold, through which the reactive gases are supplied to conduct and complete the test. The upper and lower unit laminates adjoining the aforementioned one are tested, as above, by fitting the fastening bars in the grooves 3f of the upper end plate 3 and in the grooves 4f of the lower end plate 4 and by fastening the unit laminates by means of the fastening screws in the same manner as the above one.

Figure 7:
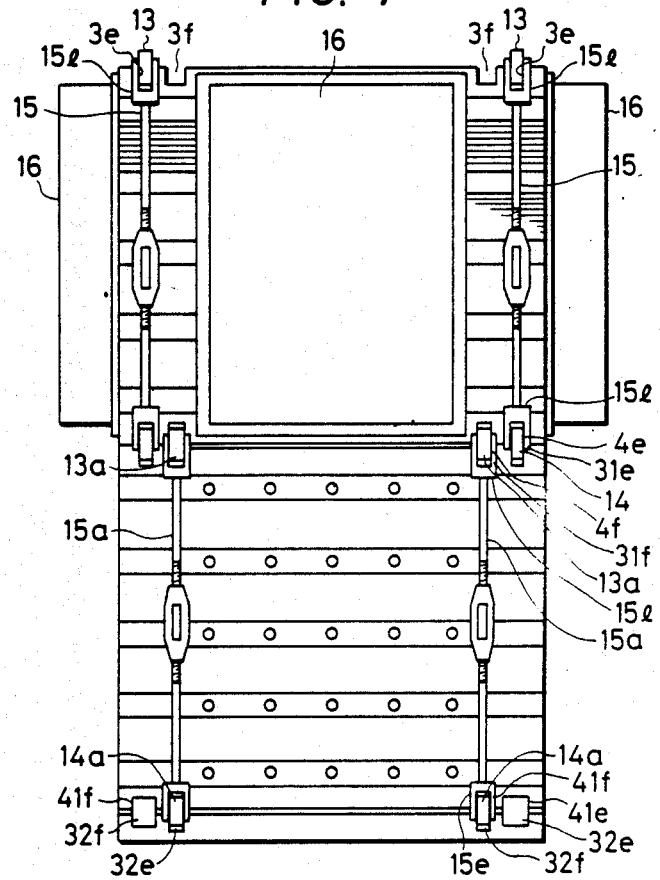
FIG. 7 is a front elevation showing the unit laminates of FIG. 6 stacked one on the other.
Figure 8:
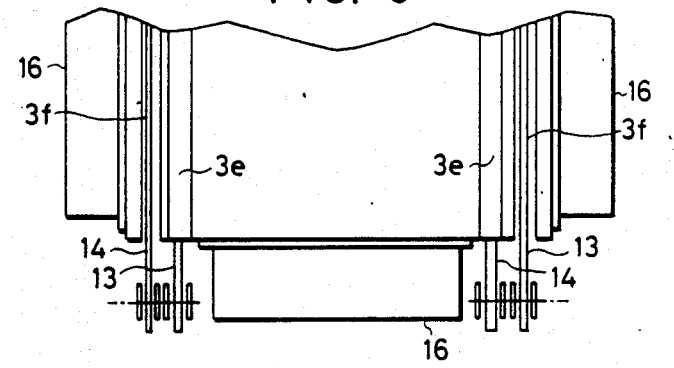
FIG. 8 is a top plan view showing a portion of FIG. 7.

FIG. 7 is a front elevation showing the stack of both the unit laminate, which is fastened by fitting the fastening bars 13 and 14 in the grooves 3e and 4e of the aforementioned end plates and by using the fastening screws 15, and the unit laminate which is fastened by fitting the fastening bars 13a and 14a in grooves 31f and 41f formed in the end plates of the adjoining unit laminate and by using the fastening screws 15a. FIG. 8 is a top plan view showing a portion of FIG. 7. In FIG. 7, the fastening bars 14 of the upper unit laminate are fitted in both the grooves 4e of the lower end plate of the unit laminate and in grooves 31e of the adjoining end plate, whereas the fastening bars 13a of the lower unit laminate are fitted in both the grooves 31f of the upper end plate of the unit laminate and in the grooves 4f of the adjoining lower end plate, and the upper and lower unit laminates are fastened by means of the fastening means 15 and 15a, respectively. Indicated at reference numeral 16, on the other hand, are reactive gas manifolds which are attached for the fuel gases and the oxidizing gases to a pair of opposed sides of the unit laminate, respectively, and the outsides of which are arranged with the fastening screws. Incidentally, the manifolds of the lower unit laminate are not shown.

FIG. 8 is a top plan view showing the portion of FIG. 7 and shows the structure in which the fastening bars 13 and 14 are arranged at both the sides of the end plates and outside of the manifolds 16. Thus, if a desired number of the unit laminates are stacked to construct the cell stack, the fastening screws are arranged in a zigzag shape for each of the adjoining unit laminates, and the fastening bars 13a and 14 and so on are arranged in both the grooves of the upper end plate and the lower end plate of the adjoining laminates. As a result, the heights of the fastening bars can be enlarged to have a high rigidity so that the grooves of one end plate may be made shallow. In other words, the end plates may be made thin. As has been described above, however, the works obtainable are similar even if the fastening bars are fitted not in both the grooves of the upper and lower end plates but only in the respective grooves. Despite of this fact, it is necessary to increase the thickness of the end plates in case the rigidity of the fastening bars is reduced.

Figure 9:
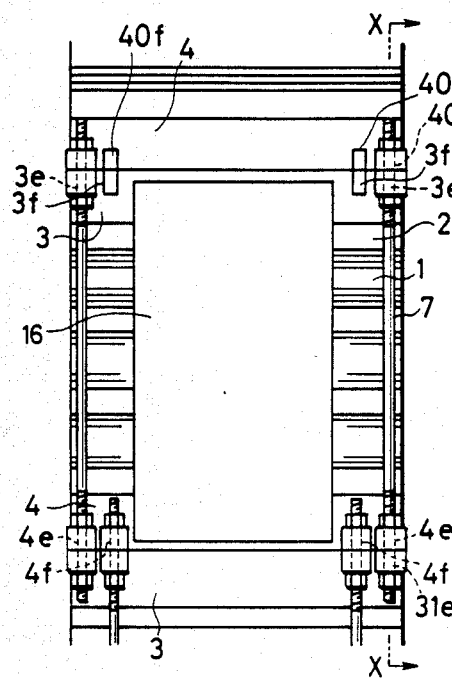
FIG. 9 is a front elevation showing a unit laminate to which is attached fastening means according to a further embodiment of the present invention.
Figure 10:
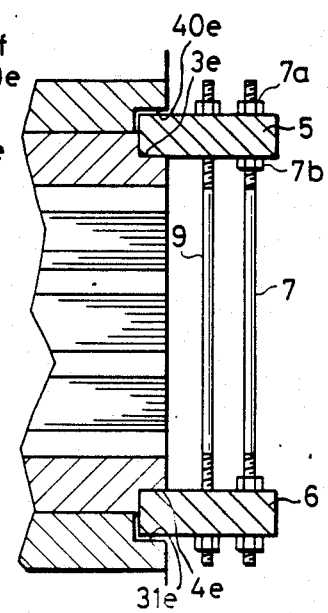
FIG. 10 is a section taken along line X—X of FIG. 9.

FIG. 9 is a front elevation showing a further embodiment of the present invention, and FIG. 10 is a section taken along line X—X of FIG. 9. In FIG. 9, the grooves 3e and 3f of the upper end plate and the grooves 4e and 4f of the lower end plate are not extended through in the direction of the sides of the end plates, as shown in FIG. 6, but are cut away, as shown in FIG. 10. In this embodiment, the cut-away grooves 3e and 40e and the cut-away grooves 4e and 31e of the vertically adjoining end plates are made to define respective grooves so that the holding plates 5 and 6 acting as the engagement members may be fitted in the upper and lower portions, respectively. The tests are completed by turning the nuts 7a and 7b on the support studs 7 to fix the holding plates 5 and 6, by fastening the unit laminate with the fastening screws 9 acting as the fastening means, and by supplying the reactive gases through the reactive gas manifolds 16 as a single unit laminate. The upper and lower unit laminates adjoining the aforementioned one are fastened as above by making use of the cut-away grooves 3f and 4f of the end plates. After the end of the similar tests, the fastening means are arranged in a zig-zag form for each unit laminate, if a desired number of the unit laminates are stacked to construct the cell stack, so that they can be arranged without any interference. The works after fastening the cell stack are similar to the aforementioned ones.

Figure 11:
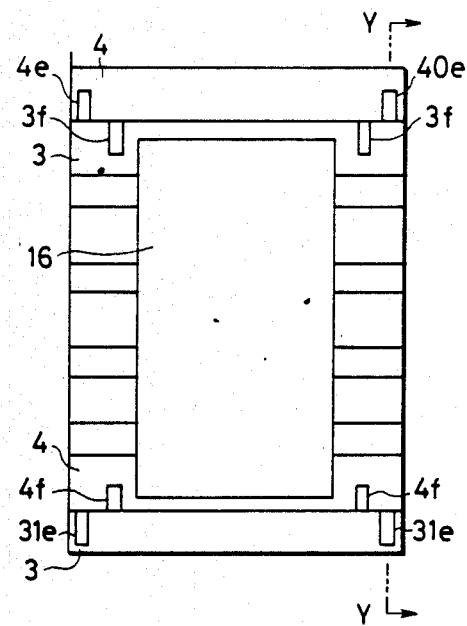
FIG. 11 is a front elevation showing a unit laminate which is formed with fastening cut-away grooves according to a further embodiment of the present invention.

FIG. 11 is a front elevation showing a further embodiment of the present invention. Although the fastening means are not shown, the cut-away grooves 3f and 4f are formed in one row at both the sides of the upper and lower end plates of one unit laminate, and the cut-away grooves 40e and 31e of the adjoining unit laminate are formed at a spacing from the cut-away grooves 3f and 4f formed in the upper and lower end plates of the aforementioned unit laminate.

Figure 12:
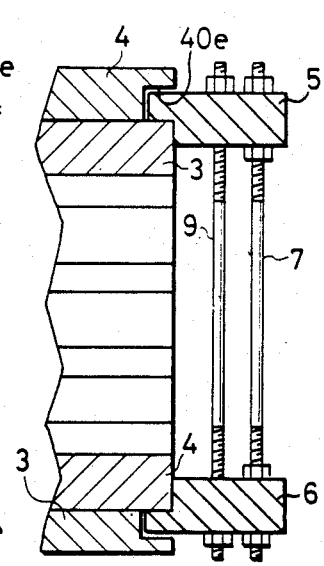
FIG. 12 is a section taken along line Y—Y of FIG. 11.

FIG. 12 is a sectional view taken along line Y—Y of FIG. 11 and showing a portion under the state in which the stepped holding plates 5 and 6 are disposed in the positions to be fitted in the cut-away grooves 40e and 31e and in which the unit laminate is fastened by means of the fastening screws by the aforementioned method. The works are similar to the aforementioned ones. In FIG. 12, moreover, the works are similar even if the holding plates 5 and 6 are fitted and fastened in the cut-away grooves 3f and 4f. Incidentally, the end plates can naturally be dispensed with, if the cooling plates are so thickened that the fastening means can be attached.

As is now apparent from the description thus far made, according to the present invention, the unit laminate is provided at its end plates with the removable pressure means so that it can be fastened of itself. As a result, the fuel cell can be tested in the fastened state by supplying the reactive gases. After the tests, a plurality of the unit laminates can be stacked to construct the cell stack while being fastened. After the end of fastening the cell stack, the pressure means of each of the unit laminates can be removed. As a result, the area pressure can be kept applied to the cell stack until the fuel cell is installed, so that the following effects can be attained: it is possible to prevent the gas leakage or matrix separation or breakage which might otherwise be caused by the separation of the sealing members between the cell elements when the cell stack is released from the area pressure; and it is also possible to prevent the electric or thermal resistance from increasing thereby to hold the cell characteristics at an excellent level. Moreover, if one of the cell elements should become bad after the unit laminates have been stacked, a predetermined fastening pressure can be applied exclusively to the bad unit. As a result, there can be an advantage that only the unit having the bad cell element can be replaced by a good one so that the maintenance and administration of the fuel cell can be facilitated.

What is claimed is:

1. A subassembly of a fuel cell, wherein said fuel cell is comprised of a plurality of stacked arrays of fuel cell elements, said subassembly comprising:
   a plurality of planar fuel cell elements stacked adjacent the planar sufaces of one another to form an array;
   a pair of planar end plates on each planar end of said array, said end plates being disposed to compress said array in a direction perpendicular to the planar surface of said elements;
   an end plate engaging means which is disposed to allow the end plate of one array to abut the end plate of an adjacent array while pressure is applied to each of said arrays, and which is removable while the end plate of one array is disposed to abut the end plate of the adjacent array; and
   fastening means passing outside said array and engaging said end plate engaging means, said fastening means upon engaging said end plate engaging means being adjustable for applying a selected tension to said end plate engaging means to induce said pressure to said array through said end plates.

2. The subassembly of claim 1 wherein said planar end plates include a plurality of holes on opposite edges thereof and wherein said removable end plate engaging means engage said holes.

3. The subassembly of claim 2 wherein said holes are threaded and said end plate engaging means include threaded members placed in said threaded holes.

4. The subassembly of claim 1 wherein said pair of end plates contain at least two lateral grooves across the outer planar surface of said end plate opposite the planar surface engaging said fuel cell elements and wherein said removable end plate engaging means comprise end plate engaging bars disposed within said grooves.

5. The subassembly of claim 2 wherein adjacent end plates in said array have holes on the edges thereof such that said fastening means may project above the abutting surfaces of said end plates without engaging the fastening means from an adjacent array.

6. The subassembly of claim 1 wherein said end plates include two pairs of parallel grooves on the surface of said end plates opposite the fuel cell element engaging surface, said grooves being disposed to receive elongated bar-like removable end plate engaging means, wherein said pairs of grooves are disposed such that said longated bar-like removable end plate engaging means from one array projecting above the outer surface of said end plate is received into the grooves in the abutting end plate, thus allowing said end plates to abut one another.

7. The subassembly of claim 1 wherein said pair of planar end plates includes a groove along opposite edges thereof and said removable end plate engaging means comprise a member disposed to engage said groove.

8. The subassembly of claim 1 wherein said fastening means is an elongated threaded member disposed between two removable end plate engaging means.

9. The subassembly of claim 8 wherein said fastening member is a turnbuckle.

* * * * *